March 14, 1939. A. DRENKARD, JR 2,150,430
RESONATOR SELECTOR FOR CARRIER CONVEYER SYSTEMS
Filed March 12, 1935
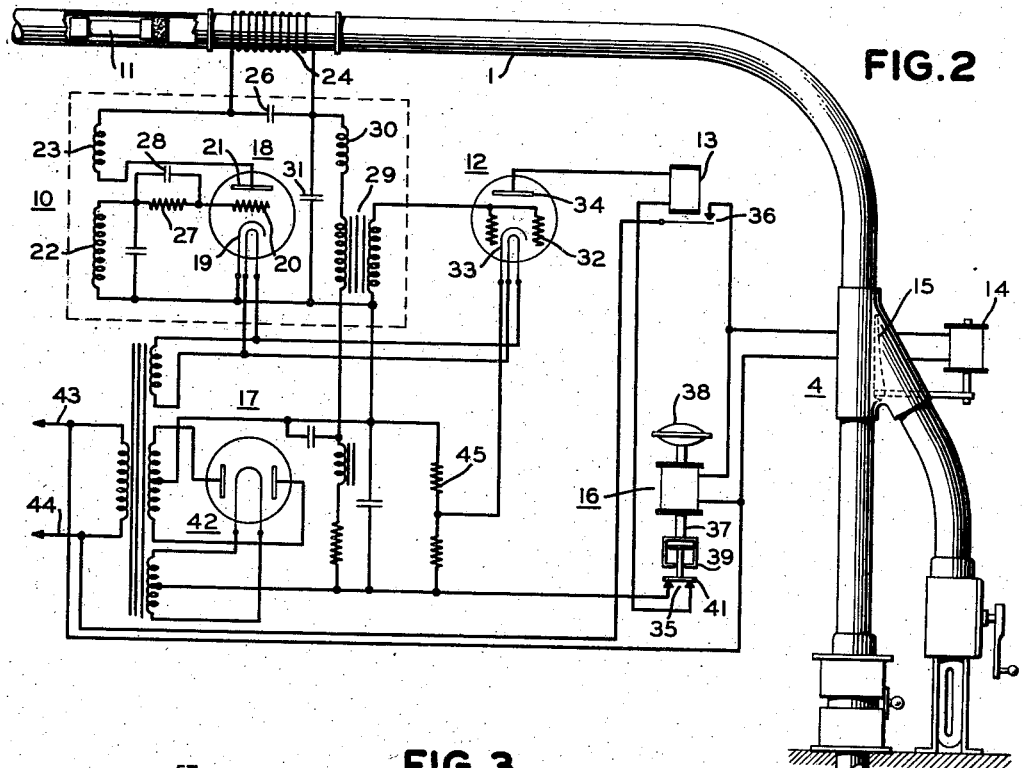
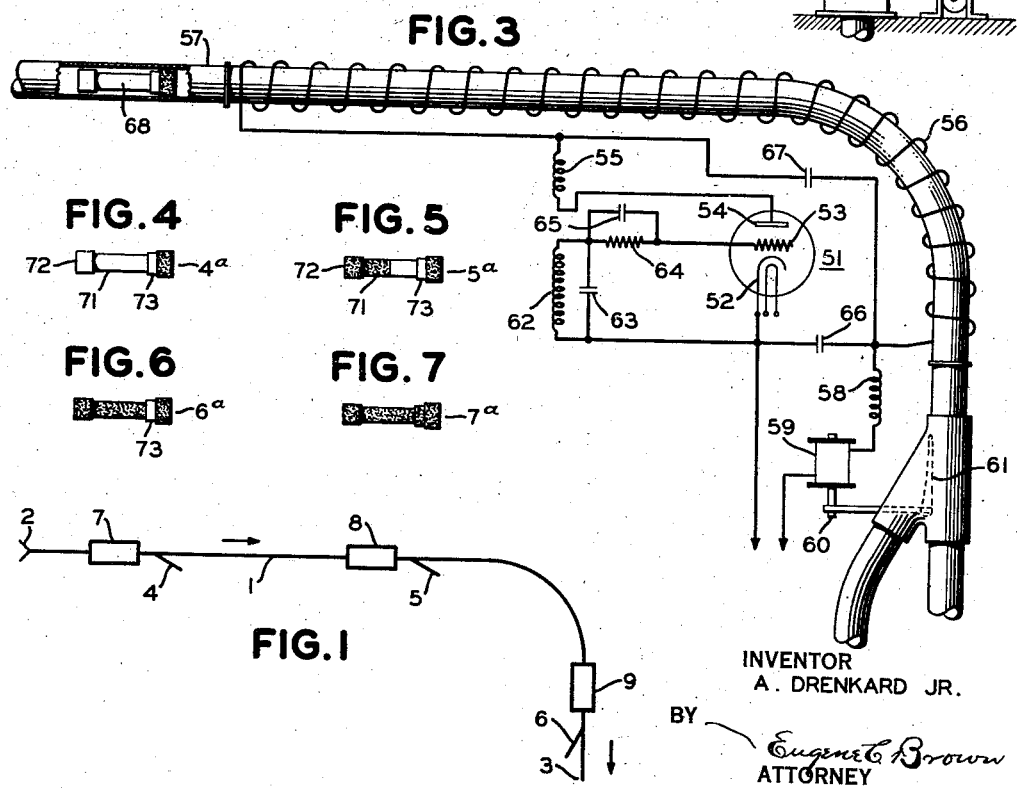
INVENTOR
A. DRENKARD JR.
BY Eugene C. Brown
ATTORNEY Patented Mar. 14, 1939

2,150,430

UNITED STATES PATENT OFFICE 2,150,430

RESONATOR SELECTOR FOR CARRIER CONVEYER SYSTEMS

Adam Drenkard, Jr., Grantwood, N. J., assignor to The Western Union Telegraph Company, New York, N. Y., a corporation of New York Application March 12, 1935, Serial No. 10,734

8 Claims. (Cl. 243—16)

This invention relates to conveyer systems in which articles are transported along a conveyer path and selectively discharged at one or more points therealong. More particularly, the invention relates to a system in which carriers are employed for conveying the articles and in which means is provided for selectively discharging the carriers.

The principal object of this invention is to provide a system in which the carriers embody means for indicating and producing selective response in accordance with the station for which they are designated and which embody the minimum departure in physical dimensions from carriers employed in a similar system in which selective discharge is not employed.

It is well understood in the carrier conveyer art that the usefulness of a carrier conveyer line such as a pneumatic tube or the like is considerably increased by providing that carriers may be selectively discharged at intermediate points along the line instead of having to traverse the entire length of the line before leaving the same. In this manner a plurality of remote stations may be served from a single sending station. Various methods have been employed heretofore for accomplishing selective discharge. However, many of the systems which have been heretofore devised entail a considerable departure in the physical dimensions of the carriers, either externally or internally over that which is required in systems where only one remote station is to be served. These changes in dimension of the carrier either interfere with the size of the article which the carrier can admit or so change the external dimensions of the carrier that it could not satisfactorily be employed in a system designed and installed for conveying carriers not to be selectively discharged. Among other things this necessarily limits the application of selective discharge arrangements to new installations or to old installations in which the maximum use of the space in the carriers previously employed have not been required.

It is another object of this invention therefore to provide a selective carrier discharge apparatus which may be applied to installations already in service without impairing the capacity and usefulness of the system as previously operated.

It is a further object of this invention to provide carriers to be employed in a selective discharge system in which the different characteristics necessary for designating the station to which the carrier is assigned and accomplishing the selective discharge of the carrier are provided by making changes in the composition of the carrier structure without appreciably altering the physical dimensions of the same.

In order to be able to provide a system such as outlined above, it is necessary to devise selectively responsive means to be employed at each of the discharge points capable of selective response to such carriers.

According to this invention such apparatus is provided by employing an oscillation generator or the like adjacent the discharge points which embodies a response or pick-up coil disposed adjacent the carrier path which is influenced by the presence of a carrier having predetermined characteristics to dampen or otherwise modify the oscillations of the generator and thus initiate the action of discharge means.

It is therefore another object of this invention to provide an oscillation generator for controlling the discharge of carriers from the conveyer path which will selectively respond to carriers differing from each other not in dissimilar physical dimensions, but in other properties such as different conductive areas embodied in the carrier structure.

When employing oscillation generators embodying electronic tubes or relays, in order to prolong the response of the associated mechanism controlling the movement of the deflecting or diverting means for discharging carriers, it is the usual practice to employ devices having the characteristics of a locking relay or a trigger operated device whose action is initiated by the relatively short period of response to the passage of a predetermined carrier, and which remains operated a sufficient time to permit the operation of the discharge device. This necessarily complicates the apparatus and adds to the cost and service required for its upkeep.

It is a further object of this invention to provide means for extending or prolonging the response of the selector or pickup device to a carrier approaching a point at which it is to be discharged. According to this invention this may be accomplished by extending the pick-up coil or inductance along the carrier path from a point remotely in advance of the discharge point to a point adjacent the discharge.

In the structure to be described more fully herein, the pick-up device is preferably in the form of an inductance coil comprised of a single helical layer surrounding the path traversed by the carriers. The carriers are provided with different areas of conductive surface incorporated in their body so that when they pass within the pick-up coil disposed about a non-metallic section of the carrier tube or guideway the capacity coupling between the turns of the coil will be affected by the presence of the conductive surface spanning several turns of the coil or substantially the entire length thereof.

Other objects of this invention will appear in the following description taken in connection with the accompanying drawing forming a part of this application, in which:

Fig. 1 is a diagrammatic view of the conveyer line having a plurality of intermediate discharge points;

Fig. 2 is a diagrammatic illustration of a typical selective device arranged to operate a discharge deflector at an intermediate point;

Fig. 3 is a similar view of a modified construction embodying an arrangement for prolonging the response of the selective mechanism at a discharge point, and Figs. 4 to 7 are illustrations of different forms of carriers which are employed in this system.

Referring now to the drawing, Fig. 1 illustrates a carrier conveyer system or line 1 extending between a sending station 2 and a remote station 3. In order that the line may serve to communicate with more than one point, intermediate branch points 4, 5 and 6 are provided, as illustrated. The carriers have suitable means thereon or characteristics embodied therein, which will cause the same to be discharged at a predetermined one of the points. Carriers not selected will be discharged at the distant point 3. The type of conveyer system or line employed may be either the one-way line illustrated or a closed or return line system in which unselected carriers are returned to the sending station.

In advance of each of the discharges or points where the carriers are to be deflected from the conveyer, selector means are provided which are selectively responsive to certain carriers for operating deflector means at the discharge point. The various deflection points 4, 5 and 6 are provided respectively with selector means 7, 8 and 9, each of which is set to respond to different carriers. For example, the selection at the first station is accomplished by the selective means 7 being set to respond only to carriers such as carrier 4a illustrated in Fig. 4, having an all metal body. Carriers having lesser amounts of metal or metallic or conductive surface in their body than carrier 4a, would not cause the selecting mechanism to respond. Selector 8 at the deflection point 5 would be set to respond to carriers having not less than half of their body composed of metallic material or embodying a metallic or conductive surface, such as carrier 5a illustrated in Fig. 5. Carriers having less than half of their body presenting a conductive surface would not cause the selector 8 to respond. Similarly, the selector 9 at the deflection point 6 would be set to respond to a carrier having only a small portion of its body comprised of metal or presenting a small conductive surface, such as the carrier 6a illustrated in Fig. 6. Of course, carriers having no metal or no conductive surface incorporated in their body, such as carrier 7a illustrated in Fig. 7 would not cause the selector 9 to respond. Such carriers as the latter, therefore, would be continued on and discharged at the distant station 3. It will be seen, therefore, that selective discharge of carriers from a conveyer path or guideway by providing selective means with suitable response sensitivity would permit the employment of carriers having substantially the same physical dimensions as would be required where the carrier is intended for a simple system having only two points, in which selection is not involved.

Fig. 2 illustrates a typical unit at one of the discharge points. Each of the discharge points as shown in Fig. 1 is provided with a unit of this type and selection is obtained by a variation in the sensitivity or response of the unit. In other words, one of the units will be set to respond to a carrier having one characteristic and another of the units to respond to a carrier having another characteristic. The carriers to be employed are diagrammatically illustrated in Figs. 4 to 6, and the manner in which the various units are set to respond to particular carriers will be made apparent as the description proceeds.

The unit illustrated in Fig. 2 comprises an oscillation generator 10 which is arranged to respond to a carrier 11 passing along a section of the conveyer line 1 in advance of a deflection point 4. The oscillation generator is arranged to excite or trigger off a gaseous discharge tube 12 which in turn closes a relay 13 energizing solenoid 14, which throws the deflector member 15 into deflecting position. Once the tube 12 is energized, it remains energized, causing the deflector 15 to be held in discharge position until the plate circuit of the tube 12 is opened by means of a retarded switch or timer 16, eliminating the necessity of employing the usual trigger. In this manner a selective system including a carrier operated restoring means can be provided wholly without mechanism operated by carrier contact. The current is provided for the various elements by means of a current supply unit 17.

The oscillation generator 10 may be of any well known type, the form shown being illustrative only. It is to be understood that any type of oscillation generator providing proper response may be employed in this system. As illustrated, the generator comprises a three element tube 18 provided with a cathode 19, a grid 20, and an anode 21. These elements are connected in a well known type of oscillation circuit which comprises a tuned inductance or coil 22 in the grid circuit, and a feed back coil 23 in the anode circuit, inductively coupled to the grid circuit. The latter may be tuned or untuned.

In series with one of the coils 22 or 23, preferably the latter, a pickup or response coil 24 is disposed, preferably around a non-conducting section of the conveyer tube 1. This provides a highly desirable form of pick-up in that it is unnecessary to insert or extend any members into the tube or guideway leaving it clear and unobstructed and obviating the possibility of broken parts entering the carrier path. The preferred form of the pickup coil 24 is a single helical layer wound around a non-metallic section of the conveyer tube. The length of this coil is preferably approximately equal to the length of the carrier 11. While the shape and arrangement of the pickup coil or equivalent carrier-responsive control element may be widely varied, it is found that best results are obtained with a plurality of turns wound in a single layer closely surrounding the path of the carrier, as shown, where it is desired to have a selective response to carriers having varying amounts of conductive surface areas, as illustrated in Figs. 4–7. The conductive area of the carrier, while adjacent a portion of the pickup coil, provides a capacity coupling between spaced turns of the coil and in effect bypasses alternating currents around a portion or all of the coil, thereby altering the resonant frequency and the impedance of the tuned circuit of the oscillator in which said coil is connected. A condenser 26 may be connected in shunt relation to the coil 24, if desired, to facilitate adjustment of the sensitivity and selectivity of the apparatus. The associated oscillator 10 may be responsive either to the change in tuning or the change in impedance of the pickup coil circuit, or preferably to both in a manner to be described.

The oscillation generator 10 may be worked in either of two ways. First, it may be set so that it is normally in oscillation and arranged so that the selector or response coil 24 acts to damp the oscillations when a carrier having a sufficient damping effect passes. Second, it may be set so that it is normally not oscillating and arranged to be thrown into oscillation by the effect which a carrier passing through the coil has upon the circuit constants. In other words, the circuit is adjusted so that it is normally just below the oscillating point and arranged so that a predetermined type of carrier in passing momentarily changes the value of the coil 24 in such a manner as to bring the circuit into resonance.

In either of these methods of working, types of grid leak arrangements well known in the art may be provided which will cause the oscillation tube employed to normally pass its minimum current and change to its maximum value in responding to the carrier; that is, in the former case when the oscillation generator is damped and in the latter case when the oscillation generator is thrown into oscillation.

For the purpose of this invention it has been found that the second of the two arrangements set forth provides the better response and this is the preferred form to be employed. However, either arrangement may be employed without departing from the spirit of this invention.

The arrangement illustrated in Fig. 2 shows the oscillation generator 10 provided with a grid leak arrangement in which the resistance 27 shunted by a condenser 28 is in series with the grid. This arrangement provides an oscillation generator in which the current flow is at a minimum when the generator is normally not oscillating.

The anode circuit of the oscillator includes the primary of transformer 29. The high frequencies are filtered out of the circuit by means of the well known arrangement of the choke 30 shunted by the condenser 31.

The relay tube 12 has its grid 32 in circuit with the secondary of the transformer 29. The tube also includes a cathode 33 and an anode 34. The tube 12 is preferably of a well known gaseous discharge type, having a trigger operating characteristic. In other words, the discharge through the tube when once started by raising the potential of the grid to the breakdown point, continues independent of the subsequent potential on the grid until the anode potential is momentarily interrupted or cut off.

In series with the anode circuit of the arc discharge tube 12 is included the winding of relay 13 and the contacts 35 of the timer 16. The winding of the time 16 is in parallel with the winding of the deflector operating solenoid 14 and the circuits to both are completed by the closing of contacts 35 of relay 13. The contacts of timer 16 are normally closed and are opened after its winding has been energized for a predetermined time during which its stem 37 travels upwardly against the bellows 38 until the yoke 39 lifts the bar 41 from the contacts 35. Obviously any ordinary retarded switch or relay may be employed as a timer to reset the apparatus.

The current supply device 17 is of a well known type embodying a rectifier 42 connected through suitable filter circuits to supply the anode potential to the tubes 12 and 18. The current supply device also, through a suitable transformer winding, supplies heating current to the cathodes of these tubes. The current for operating the timer 16 and solenoid 14 is taken directly from the power leads 43 and 44. It is understood, however, that suitable current may be supplied in any well known manner, such as from a direct current source, the arrangement herein being typical of that employed in the apparatus which has been devised.

The operation of the selecting mechanism just described will readily be apparent in tracing the actions occurring when a carrier 11 having metallic material or a conductive surface in its body causes the selector to respond. It will be assumed that the carrier 11 has an all metal body such as the carrier 4a illustrated in Fig. 4. It has been found, however, that a carrier whose body is covered with a conductive material such as an extremely thin metal foil or other conductive coating, will have substantially the same response in the type of selective device illustrated as a carrier having a metal body. The essential requirement of the carrier is a conductive surface which will effect a change of capacity between spaced turns of the pickup coil 24, or expressed in another way, increase the capacitative coupling between the ends or intermediate points of the coil.

The pickup coil 24 is placed ahead of the deflector or diverting member 15 a distance relative to the speed of the carrier such that sufficient time will elapse between the arrival of a carrier within the coil 24 and its arrival at the discharge point to permit the deflector member to move into discharge position across the path of the carrier tube 1. With standardized types of apparatus, this time will be well within one second.

Assuming that the carrier 11 is approaching the pickup coil 24, as it reaches the coil, by virtue of the capacity effect of its conductive surface on the coil, as already explained, the oscillation generator 10 is thrown into oscillation. This causes a sudden change in the amount of current passed by the tube 18 causing a current pulse through the primary of the transformer 29. This pulse induces simultaneously a potential in the secondary of the transformer which is imposed upon the bias resistance 45. This pulse will raise the potential of the grid 32 with respect to the cathode 33 of the tube 12 to a point which will permit the arc to form between the cathode and the anode 34. The current thus passing through the tube will energize relay 13, to close the contacts 36. This completes the circuit from the supply leads 43 and 44 to energize, simultaneously, the winding of the solenoid 14, cause its armature to pull up and move the deflector member about its pivot point to a position across the path of the carrier tube 1 and also to energize the winding of the timer 16, causing an upward pull to be exerted upon the stem 37 against the bellows 38. As the timer stem 37 travels upwardly, the solenoid 14 continues to hold the deflector in discharge position diverting the carrier into the branch or discharge section of the carrier tube. When the timer stem has been raised to a point where the yoke 39 lifts the bar 41, the circuit to the discharge tube 12 opens quenching the arc therethrough and terminating the supply of current to the relay 13. This permits the contact 36 to open, opening the current supply circuit to the windings of the solenoid 14 and timer 16. The armatures of these devices then drop back to their normal position, that of the solenoid opening the conveyer path and that of the timer closing the plate circuit to the arc discharge tube. The apparatus is now in condition for responding to the arrival of a subsequent carrier which is of a character to produce a response in the pickup coil of the oscillation generator. A similar action takes place in each of the pickups 7, 8 and 9, when carriers having predetermined conductive areas, designating them to be discharged or diverted at those points, pass through the pickup coils of the respective oscillation generators set to respond to them.

Another form of selector and associated apparatus for operating the discharge deflector is shown in Fig. 3. This arrangement represents substantially the minimum amount of apparatus that can be employed according to the methods of this invention. According to this embodiment, the physical structure has been reduced to a single electronic device which operates both as the oscillation generator and the relay for supplying the operating current to the solenoid for operating the deflector member. The associated circuit elements provide a suitable oscillating circuit with means to connect the current supply to the oscillation generator tube in series with the deflector solenoid.

Specifically, the apparatus comprises a three element tube 51, preferably of the ordinary high vacuum or triode type or of any other type suitable to work in an oscillating circuit. Preferably the tube is of relatively large current capacity. In practice it will be found that a suitable tube may be had among the relatively inexpensive types. The tube embodies a cathode 52 and a grid 53 connected through a grid leak circuit to the cathode, and an anode 54 connected through a circuit comprising a feed back coil 55, a pickup coil 56 surrounding the carrier tube 57, a choke 58 and the winding of a solenoid 59, the latter being connected through its armature 60 to operate the deflector 61, thence to a source of positive potential. Negative potential is supplied from a suitable source to the cathode of the tube. The grid circuit of the tube 51 comprises a coil 62 tuned by a suitable condenser or capacitance 63 and connected through a grid leak arrangement embodying resistance 64 shunted by condenser 65. The inductances 55 and 62 are suitably coupled to provide the feed back required to cause the circuit to oscillate when tuned near its resonant point. The high frequencies of the oscillating circuit are shunted out of the solenoid 59 and returned to the cathode circuit by a shunt condenser 66. If necessary, condenser 67 may be placed in shunt to the pickup coil 56 in order to bring the circuit to a point just below resonance.

It will be particularly noted with this arrangement that the pickup coil 56 has its windings spaced relatively a greater distance apart than they normally would be and that the coil extends a considerable distance along the conveyer tube 57. The spacing of the turns of the coil is not very material, it being only necessary to provide a coil which will oscillate, in connection with the remainder of the circuit, at a suitable frequency. The characteristics of the circuit arrangement comprising the oscillating generator are such that the presence of a carrier having a predetermined conductive surface in its body within any portion of the pickup coil 56 will bring the circuit into resonance and cause the generator to be thrown into oscillation. The length of the coil 56 is so chosen with respect to the speed of travel of the carrier, that the changed operating condition of the generator produced by the presence of the carrier within the coil will be maintained for a time sufficient for the solenoid 59 to move the deflector member 61 into diverting position before the carrier passes from the end of the coil. It should be noted that the terminus of the coil should not be a distance from the point where the carrier is deflected from the tube or guideway sufficiently remote to permit the deflector member 61 to make any material progress in its natural return movement to its normal position after the holding current produced by the generator has ceased as a result of the passing of the carrier from the coil terminus. It will be found that these conditions can be readily met in apparatus which may be easily provided. The sensitivity of the selector apparatus may be adjusted by adjusting the tuning of the generator circuit for selectively responding to carriers having different amounts of conductive surface in their body, substantially as heretofore described in connection with the first method of operation of apparatus illustrated in Fig. 2.

To illustrate the operation, it is assumed that the carrier 68 is of the type which will cause the generator to respond. As it enters the coil 56, it will throw the generator into oscillation, thereby increasing the current passed through the tube 51, which in turn increases the current passing through the winding of the solenoid 59, causing its armature to move to a new position which may be so linked to the deflector member 61 as to move it into diverting position across the conveyer tube 57. This condition will be continued as the carrier travels along the portion of the conveyer tube enclosed within the pickup coil 56 and thus maintain the changed condition of the oscillator for a time sufficient for the deflector to be moved into diverting position before the carrier arrives. Due to the speed of the carrier no difficulty will be encountered in its arriving at the point of deflection before the deflector member 61 has started to return to its normal position. In this manner it will be seen that apparatus for accomplishing all of the necessary functions of a carrier selector has been embodied in an extremely simple structure restricted to the minimum number of parts.

Referring particularly to the types of carriers which it is proposed to employ in the conveyer system described here, four types are illustrated in Figs. 4 to 7. These carriers may be made in substantially the same dimensions as carriers now employed in the systems which do not involve selective discharge and which utilize carriers of substantially identical construction. In constructing the carriers according to this invention two methods may be employed. One of these methods is by making the carrier body or a certain longitudinal portion thereof of metal or conductive material which will present a predetermined amount of conductive surface for influencing the coupling of the turns of the pickup coil as heretofore described. On the other hand the body may have applied thereto a metal foil or a conductive coating extending over a predetermined longitudinal portion of the body. As illustrated in Fig. 4, the carrier may be constructed of a metal tube 71 having collar 72 and cup 73 fitted thereon also of metal. The cup 73 carries the usual fibre head or buffer member essential for high speed carriers. In Fig. 5 is illustrated a carrier having half of its body constructed to present a conductive surface. The simplest method of providing this arrangement is incorporating in one-half of the surface of the carrier a metal foil and constructing the carrier body of fibre in the well known manner. In this arrangement the tube 71 may be fibre with a metal foil encircling the half of the tube adjacent the carrier head. Preferably the collar member 72 is likewise of fibre while the cup 73 will be metal.

Fig. 6 shows another carrier in which only a small portion of the body presents a conductive surface. The simplest method of providing this is to make all of the carrier except the cup 73 of fibre, the cup being metal and providing the conductive surface.

Fig. 7 illustrates an all fibre carrier which has substantially no conductive surface and to which none of the selecting mechanisms will respond. Obviously, in any of the carriers described, the conductive surface may be provided by any suitable type of conductive coating and is not necessarily limited to metal or metal foil.

From the above it will be seen that the system of selective carrier discharge constructed according to this invention may be readily applied to pneumatic carrier conveyer systems now in use and that carriers may be provided for the system having substantially the same physical dimensions as those at present employed. In this manner no elements will be introduced into the construction of the carrier which would limit its capacity for admitting the articles for which the original system was designed or which would interfere with the passage of the carriers through the curved or arcuate portions of the tubular guideway as now constructed. It is readily understood by those skilled in the art that there is a definite relation between the diameter and length of a carrier for use in a tubular guideway and the minimum radius of the arcs employed in installing the tubes where they change direction.

From the above description it will be seen that a conveyer system has been provided for selectively discharging carriers at intermediate points along a single guideway embodied in simple, inexpensive and easily constructed apparatus which changes to a minimum degree a well known standard of practice at present employed in the art. It will also be seen that a novel method of selection has been provided which is easily applied to selectively discharge carriers in any type of conveyer system from their path of travel. It will further be seen that according to one embodiment of the invention, the apparatus required for accomplishing selective discharge has been reduced to a comparatively few inexpensive elements, making it easily applied to conveyer systems and requiring the minimum amount of supervision and upkeep.

Also, according to this invention, a group of carriers has been provided with means for causing each of several carriers to be selectively diverted or discharged from the guideway at a predetermined point for which the carrier was intended with substantially no alteration of the physical dimensions of the carriers either internally or externally by merely substituting metallic parts or members for parts or members of normally nonmetallic carriers of a previously devised standard design.

Another advantage of this invention is that a selective control system has been devised without employing any response or control element which protrudes or extends into the carrier tube or guideway. According to the system here devised, the carrier path is as free from obstruction and the possibility of detached members or parts entering the same as if no selection devices were employed.

While this invention has been shown in but two forms, it will be obvious to those skilled in the art that it is not so limited but susceptible to various other changes and modifications without departing from the spirit thereof, and it is desired, therefore, that only such limitations shall be placed thereon as are imposed by the prior art or as specifically set forth in the appended claims.

What I claim is:

1. In a carrier conveyer system, a conveyer line and carriers for said line, an oscillation generator arranged to be normally not in a state of oscillation and including a resonant circuit, a coil so disposed that carriers pass the same, certain of said carriers having a partly conductive body suitable for momentarily bringing said generator into oscillation by electrostatic coupling with separate convolutions of said coil, and means responsive to the oscillations produced by said generator for controlling the path of travel of said carrier.

2. In a carrier conveyer system, carriers for said system embodying a conductive surface of substantial length, carrier control means including an inductive control element adjacent the path traversed by the carriers and selectively responsive to carriers embodying conductive surface of predetermined length for controlling the path of said carriers in accordance therewith.

3. In a carrier conveyer system, carriers for said system embodying metallic material extending along the carrier in a direction longitudinally of its path of travel varying in longitudinal extent, carrier control means including means inductively responsive to carriers embodying metallic material of a predetermined length for controlling the path of said carriers in accordance therewith.

4. In a pneumatic carrier system, a carrier tube having means at intermediate points therealong for selectively diverting carriers therefrom, selective means adjacent the diversion points for operating the diverting means to diversion position, said selective means including a helical pick-up coil disposed about the carrier tube and extended therealong a distance substantially greater than the length of the carrier.

5. A carrier conveyer system comprising carriers provided with longitudinally extending conductive portions, a conveyer line for said carriers, an oscillation-generator associated with said conveyer line, said generator having a tuned circuit and a pickup coil in said tuned circuit, the size of said pickup coil and its relation to the conveyer line being such that a capacity coupling between spaced turns of at least a portion of said coil will be provided by the conductive portion of a carrier passing through said line to thereby affect the operation of said generator, and means including the oscillation generator for controlling the path of travel of the carriers.

6. A system according to claim 5 in which selective discharge of carriers is effected by a plurality of oscillation generators arranged to be severally responsive to the conductive portions of said carriers depending upon the extent of the conductive portions of carriers destined for different discharge points.

7. A carrier conveyer system comprising carriers embodying conductive surface areas, a conveyer line for said carriers, an oscillation generator including a tuned circuit and a pickup coil in said tuned circuit, said coil being so disposed with respect to the conveyer line that the conductive surfaces of the carriers passing through said line will, by electrostatic coupling with separate convolutions of said coil, effect a change in the oscillatory status of said generator, and means including the oscillation generator for controlling the path of travel of the carriers.

8. A system according to claim 7 in which selective discharge of carriers is effected by a plurality of oscillation generators arranged to be severally responsive to the conductive surface areas of said carriers depending upon the extent of the areas of the carriers destined for different discharge points.

ADAM DRENKARD, Jr.